United States Patent
He (10) Patent No.: US 9,699,774 B2
(45) Date of Patent: Jul. 4, 2017

(54) METHOD AND APPARATUS FOR SENDING CONTROL CHANNEL INFORMATION BASED ON MULTI-SECTOR CELL NETWORKING

(71) Applicant: Huawei Technologies Co., Ltd., Shenzhen, Guangdong (CN)

(72) Inventor: Longke He, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 14/883,314

(22) Filed: Oct. 14, 2015

(65) Prior Publication Data
US 2016/0037499 A1 Feb. 4, 2016

Related U.S. Application Data

(63) Continuation of application No. PCT/CN2013/074381, filed on Apr. 18, 2013.

(51) Int. Cl.
*H04W 72/04* (2009.01)
*H04B 17/318* (2015.01)
(Continued)

(52) U.S. Cl.
CPC ........ *H04W 72/042* (2013.01); *H04B 17/318* (2015.01); *H04W 48/00* (2013.01); *H04W 48/20* (2013.01); *H04W 74/002* (2013.01)

(58) Field of Classification Search
CPC ... H04W 72/042; H04W 48/00; H04W 48/20; H04B 17/318
See application file for complete search history.

(56) References Cited

U.S. PATENT DOCUMENTS 6,141,335 A  10/2000 Kuwahara et al.
2002/0196752 A1  12/2002 Attar et al.
(Continued)

FOREIGN PATENT DOCUMENTS

CN  1189068 A  7/1998
CN  1870832 A  11/2006
(Continued)

OTHER PUBLICATIONS

"Combination of ICI cancellation and coordination: performance and TP", RITT, Huawei, 3GPP TSG-RAN WG1 #45 Meeting, May 8-12, 2006, 8 pages, R1-061178.
(Continued)

*Primary Examiner* — Siming Liu (57) ABSTRACT

The present invention discloses a method and an apparatus for sending control channel information based on multi-sector cell networking. The method includes: obtaining, according to an uplink signal sent by a user equipment, uplink signal strength information corresponding to each sector, where each sector uses a same cell identification, and the uplink signal strength information is used to indicate a level corresponding uplink signal strength; selecting a working sector for the user equipment from the sectors according to the uplink signal strength information corresponding to each sector; and sending control channel information to the user equipment through the working sector, and not skipping sending control channel information to the user equipment through the sectors except the working sector.

14 Claims, 8 Drawing Sheets

(51) Int. Cl.
*H04W 48/00* (2009.01)
*H04W 74/00* (2009.01)
*H04W 48/20* (2009.01)

(56) References Cited

U.S. PATENT DOCUMENTS

| | | |
|---|---|---|
| 2006/0136790 A1 | 6/2006 | Julian et al. |
| 2007/0049324 A1* | 3/2007 | Sambhwani .......... H04W 48/20 455/525 |
| 2007/0153929 A1 | 7/2007 | Ballentin et al. |
| 2007/0161389 A1* | 7/2007 | Khandekar .......... H04W 48/12 455/517 |
| 2009/0046793 A1 | 2/2009 | Love et al. |

FOREIGN PATENT DOCUMENTS

| | | |
|---|---|---|
| CN | 1968054 A | 5/2007 |
| CN | 1996987 A | 7/2007 |
| CN | 101120531 A | 2/2008 |
| CN | 101779405 A | 7/2010 |
| CN | 102014395 A | 4/2011 |
| CN | 102204336 A | 9/2011 |
| WO | WO 2008/061803 A2 | 5/2008 |
| WO | WO 2012/134565 A1 | 10/2012 |

OTHER PUBLICATIONS

Wang Xianyong, "On the RRU total GSM cell improve spectrum utilization", China Academic Journal Electronic Publishing House, Apr. 15, 2012, 3 pages.

* cited by examiner

METHOD AND APPARATUS FOR SENDING CONTROL CHANNEL INFORMATION BASED ON MULTI-SECTOR CELL NETWORKING

CROSS-REFERENCE TO RELATED APPLICATIONS

This application is a continuation of International Application No. PCT/CN2013/074381, filed on Apr. 18, 2013, which is hereby incorporated by reference in its entirety.

TECHNICAL FIELD

The present invention relates to the field of communications technologies, and in particular, to a method and an apparatus for sending control channel information based on multi-sector cell networking.

BACKGROUND

With the development of the mobile Internet and smart devices, higher requirements are put forward for a capacity of a wireless network. Measures taken in a traditional capacity expansion solution mainly include adding a carrier for a system, adding a site, or the like. The cost of the traditional capacity expansion solution is excessively high due to limited network spectrum resources, a great difficulty in site acquisition, and a high cost of launching a new site.

Figure 1:
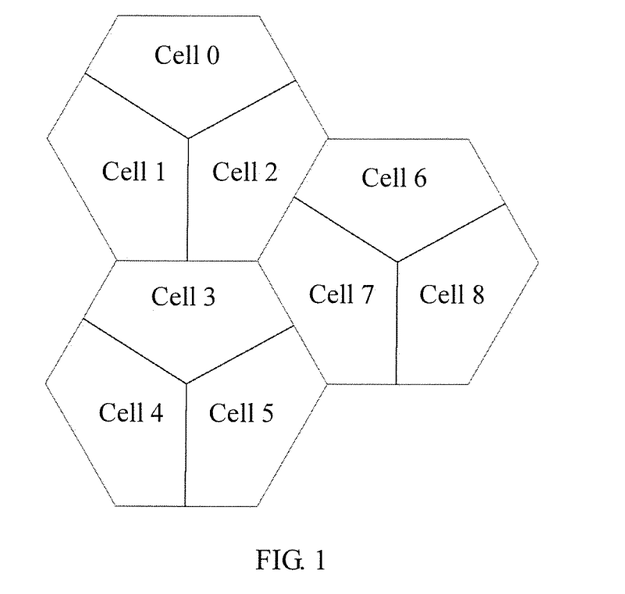
FIG. 1 is a schematic diagram of dividing a signal coverage area of a base station into 3 traditional sectors.

A coverage area of a base station is generally determined by a coverage area of a signal sent by a base station antenna. A traditional sector refers to a sector area covered by a beam transmitted by a base station antenna. Referring to FIG. 1, a coverage area of a base station including 3 antennas is generally divided into 3 traditional sectors.

In a case where no site or carrier is added, in order to implement capacity expansion of a wireless network, a sector splitting technology is generally used for splitting a traditional sector with a high capacity requirement into a plurality of sectors, so that the number of sectors of a base station is increased and more carriers are allocated within coverage areas of the additional sectors. The increase in the number of carriers enables a base station to serve more user equipments. Therefore, the traditional sector splitting technology can implement capacity expansion of a wireless network with a low cost. However, in the traditional sector splitting technology, because each sector obtained by splitting is planned as a cell, a coverage area of a cell corresponding to a sector is greatly reduced. Therefore, signal interference between the cells is aggravated, which affects the handover and accessibility performance, and the like of a wireless network and increases the complexity of network planning and optimization.

Figure 2:
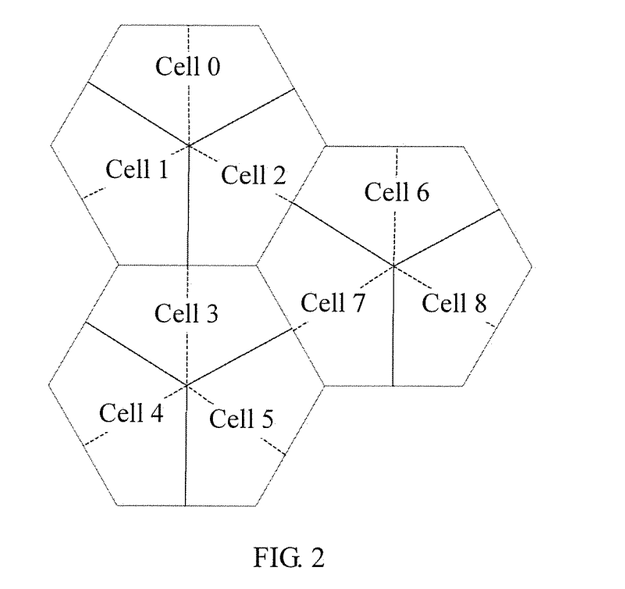
FIG. 2 is a schematic diagram of 6 sectors obtained by splitting 3 traditional sectors in a multi-sector cell networking technology.

FIG. 2 is a schematic diagram of 6 sectors obtained by splitting 3 traditional sectors in a multi-sector cell networking technology, in which two smaller sectors obtained by splitting a same traditional sector are separated by a dotted line. In the multi-sector cell networking technology, the two smaller sectors obtained by splitting the same traditional sector share a same cell identity and send same pilot signals and same common channel information. That is, in the multi-sector cell networking technology, the two smaller sectors obtained by splitting the same traditional sector together form a cell.

Figure 3:
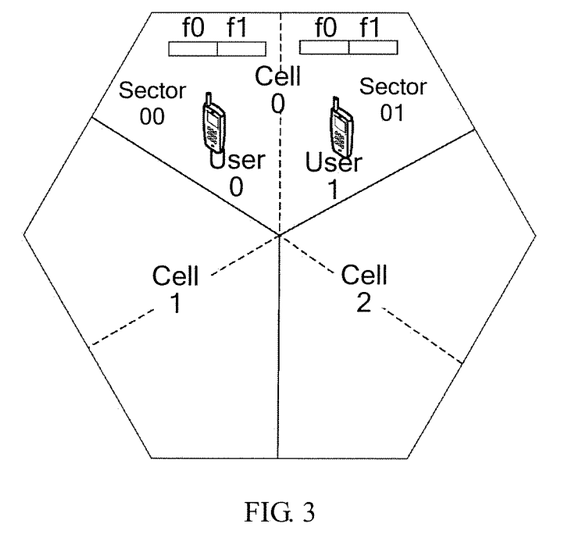
FIG. 3 is a schematic diagram of using a multi-sector cell networking technology to send control channel information in the case of virtual 6-sector.

In the multi-sector cell networking technology, control channel information is sent in a joint transmission manner, that is, a base station transmits the control channel information to a user equipment simultaneously in all sectors of a cell in which the user equipment is located. FIG. 3 is a schematic diagram of using the multi-sector cell networking technology to send control channel information in the case of virtual 6-sector. User 0 and user 1 are two user equipments, and cell 0, cell 1, and cell 2 are three cells of a same base station. User 0 is located in sector 00 of cell 0, and user 1 is located in sector 01 of cell 0. A frequency domain location f0 is used by a control channel of user 0, and a frequency domain location f1 is used by a control channel of user 1. Control channel information is sent to a same user equipment through left and right sectors of cell 0 simultaneously, for example, control channel information is sent to user 0 in frequency domain location f0, or control channel information is sent to user 1 in frequency domain location f1.

In FIG. 3, in joint transmission, when control channel information is sent to user 1 through sector 01 of cell 0, the control channel information is also sent to user 1 through sector 00 of cell 0. Therefore, cell 2 is interfered with by a signal sent in sector 00 of cell 0. That is, although sector 00 in cell 0 is not adjacent to cell 2, when a signal is sent to user equipment user 1 through sector 00 of cell 0, cell 2 is still interfered with by the signal. Similarly, in joint transmission, when a signal is sent to user 0 through sector 00 of cell 0, the signal is also sent to user 0 through sector 01 of cell 0. Therefore, cell 1 is interfered with by the signal sent in sector 01 of cell 0. That is, although sector 01 in cell 0 is not adjacent to cell 1, when a signal is sent to user equipment user 0 through sector 01 of cell 0, cell 1 is still interfered with by the signal.

SUMMARY

Embodiments of the present invention provide a method and an apparatus for sending control channel information based on multi-sector cell networking, to prevent a problem in a multi-sector cell networking technology that when a signal is sent in a sector of a certain cell, a cell not adjacent to the sector is interfered with by the signal.

A first aspect provides an access network device based on multi-sector cell networking, including at least one wireless transceiver, at least one processor, and at least one memory, where the memory is configured to store program code;
   the wireless transceiver is configured to receive, through each sector separately, an uplink signal sent by a user equipment;
   the processor is configured to invoke the program code in the memory, to execute the following operations:
   obtaining, according to the uplink signal received by the wireless transceiver, uplink signal strength information corresponding to each sector, where each sector uses a same cell identity, and the uplink signal strength information is used to indicate a level of corresponding uplink signal strength;
   selecting a working sector for the user equipment from sectors according to the uplink signal strength information corresponding to each sector; and
   instructing the wireless transceiver to send control channel information to the user equipment through the working sector, and instructing the wireless transceiver not to send the control channel information to the user equipment through the sectors except the working sector; and
   the wireless transceiver is further configured to send the control channel information to the user equipment.

With reference to the first aspect, in a first possible implementation manner, the processor is specifically configured to:

compare the uplink signal strength information corresponding to the sectors, and select a sector corresponding to a maximum value of uplink signal strength information as the working sector for the user equipment.

With reference to the first possible implementation manner of the first aspect, in a second possible implementation manner, the processor is further configured to: when a working sector detection timer times out, start working sector detection, and compare the uplink signal strength information corresponding to the sectors.

With reference to the first aspect, in a third possible implementation manner, the processor is specifically configured to:

select a first sector corresponding to a maximum value of uplink signal strength information as a first working sector for the user equipment; and if a difference between the uplink signal strength information of the first working sector and uplink signal strength information of any other sector is greater than a preset threshold, determine that the first working sector is the working sector for the user equipment.

With reference to the first aspect or any one of the foregoing possible implementation manners of the first aspect, in a fourth possible implementation manner, the uplink signal strength information corresponding to each sector and obtained by the processor according to the uplink signal sent by the wireless transceiver includes any one of the following:

uplink RSRP; or
an uplink RSSI; or
an uplink SINR.

A second aspect provides a method for sending control channel information based on multi-sector cell networking, including:

obtaining, according to an uplink signal sent by a user equipment, uplink signal strength information corresponding to each sector, where each sector uses a same cell identity, and the uplink signal strength information is used to indicate a level of corresponding uplink signal strength;

selecting a working sector for the user equipment from sectors according to the uplink signal strength information corresponding to each sector; and sending the control channel information to the user equipment through the working sector, and skipping sending the control channel information to the user equipment through the sectors except the working sector.

With reference to the second aspect, in a first possible implementation manner, the determining a working sector for the user equipment according to the uplink signal strength information corresponding to each sector specifically includes:

comparing the uplink signal strength information corresponding to the sectors, and selecting a sector corresponding to a maximum value of uplink signal strength information as the working sector for the user equipment.

With reference to the first possible implementation manner of the second aspect, in a second possible implementation manner, the comparing the uplink signal strength information corresponding to the sectors further includes:

when a working sector detection timer times out, starting working sector detection, and comparing the uplink signal strength information corresponding to the sectors.

With reference to the second aspect, in a third possible implementation manner, the determining a working sector for the user equipment according to the uplink signal strength information corresponding to each sector specifically includes:

selecting a first sector corresponding to a maximum value of uplink signal strength information as a first working sector for the user equipment;

if a difference between the uplink signal strength information of the first working sector and uplink signal strength information of any other sector is greater than a preset threshold, determining that the first working sector is the working sector for the user equipment.

With reference to the second aspect or any one of the foregoing possible implementation manners of the second aspect, in a fourth possible implementation manner, the uplink signal strength information includes any one of the following:

uplink RSRP; or
an uplink RSSI; or
an uplink SINR.

According to a third aspect, an apparatus for sending control channel information based on multi-sector cell networking is provided, including:

a receiving module, configured to receive an uplink signal sent by a user equipment;

a sending module, configured to send control channel information to the user equipment;

a processing module, configured to obtain, according to the uplink signal sent by the user equipment and received by the receiving module, uplink signal strength information corresponding to each sector, where each sector uses a same cell identity, and the uplink signal strength information is used to indicate a level of corresponding uplink signal strength; and a selecting module, configured to select a working sector for the user equipment from sectors according to the uplink signal strength information corresponding to each sector and obtained by the processing module; and the processing module is further configured to instruct the sending module to send the control channel information to the user equipment through the working sector selected by the selecting module, and instruct the sending module not to send the control channel information to the user equipment through the sectors except the working sector.

With reference to the third aspect, in a first possible implementation manner of the third aspect, the selecting module is specifically configured to:

compare the uplink signal strength information sent by the receiving module, and select a sector corresponding to a maximum value of uplink signal strength information as the working sector for the user equipment.

With reference to the first possible implementation manner of the third aspect, in a second possible implementation manner, the selecting module is further configured to:

when a working sector detection timer times out, start working sector detection, and compare the uplink signal strength information corresponding to the sectors.

With reference to the third aspect, in a third possible implementation manner, the selecting module is specifically configured to:

select a first sector corresponding to a maximum value of uplink signal strength information as a first working sector for the user equipment; and if a difference between the uplink signal strength information of the first working sector and uplink signal strength information of any other sector is greater than a preset threshold, determine that the first working sector is the working sector for the user equipment.

With reference to the third aspect or any one of the foregoing possible implementation manners of the third aspect, the uplink signal strength information corresponding to each sector and obtained by the receiving module includes any one of the following:

uplink RSRP; or an uplink RSSI; or an uplink SINR.

In the embodiments of the present invention, uplink signal strength information corresponding to each sector is obtained according to an uplink signal sent by a user equipment, where each sector uses a same cell identity; a working sector for the user equipment is selected from sectors according to the uplink signal strength information corresponding to each sector; and then control channel information is sent to the user equipment through the working sector, and the control channel information is not sent to the user equipment through the sectors except the working sector. In this way, a cell is prevented from being affected by a sector which is not adjacent to the cell, and therefore is not interfered with by a signal; a signal-to-interference ratio of a control channel is improved; and network indicators such as a handover success rate and an access success rate are improved. In addition, a capacity of a control channel is expanded, which further improves performance of the control channel, reduces consumption of system resources, and effectively improves performance of a wireless network.

DETAILED DESCRIPTION

Embodiments of the present invention provide a method and an apparatus for sending control channel information based on multi-sector cell networking, where a working sector is selected from sectors included in a cell, to which a user equipment belongs, according to an uplink signal sent by the user equipment, then control channel information is sent to the user equipment through the working sector, and the control channel information is not sent to the user equipment through the sectors except the working sector, so as to prevent a problem in a multi-sector cell networking technology that when a sector in a certain cell transmits a signal, a cell not adjacent to the sector is interfered with by the signal.

Figure 4A:
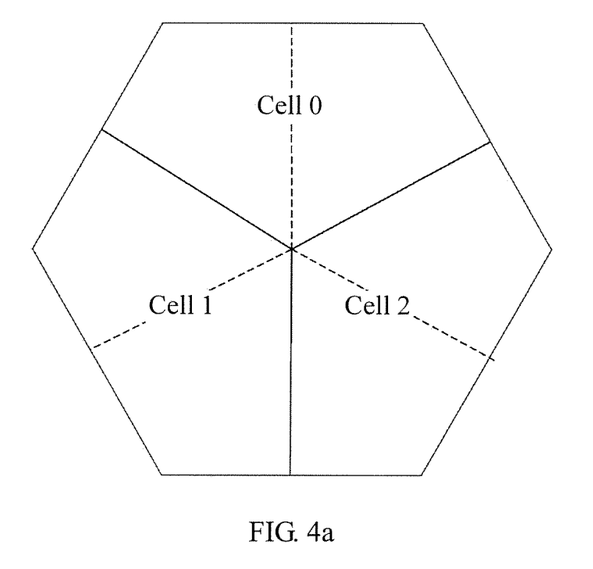
FIG. 4a is a schematic diagram of horizontally splitting each traditional sector into 2 smaller sectors according to an embodiment of the present invention.
Figure 4B:
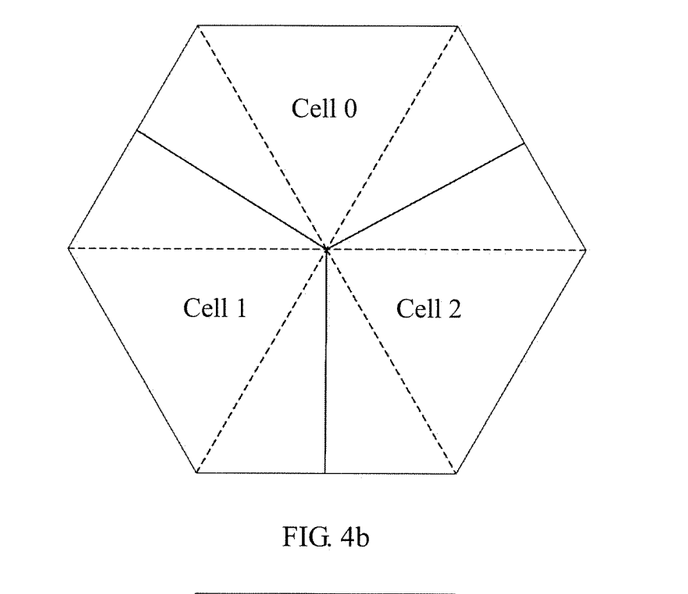
FIG. 4b is a schematic diagram of horizontally splitting each traditional sector into 3 smaller sectors according to an embodiment of the present invention.
Figure 4C:
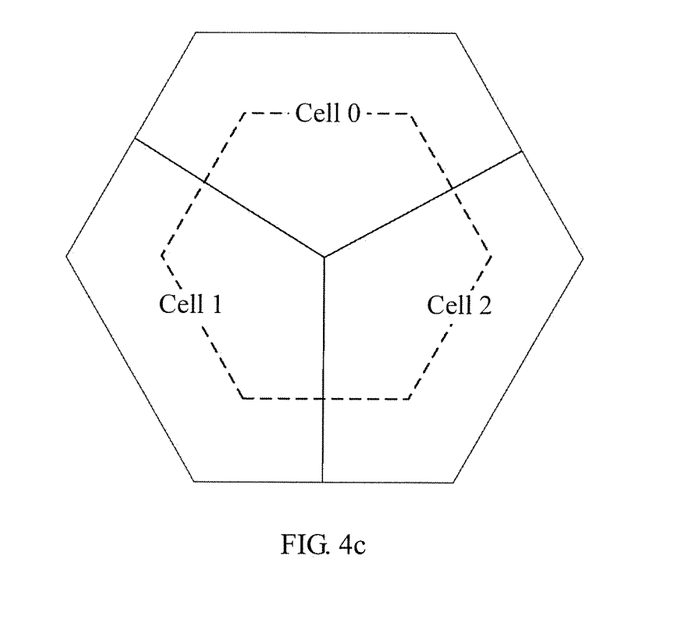
FIG. 4c is a schematic diagram of horizontally splitting each traditional sector into 4 smaller sectors according to an embodiment of the present invention.
Figure 4D:
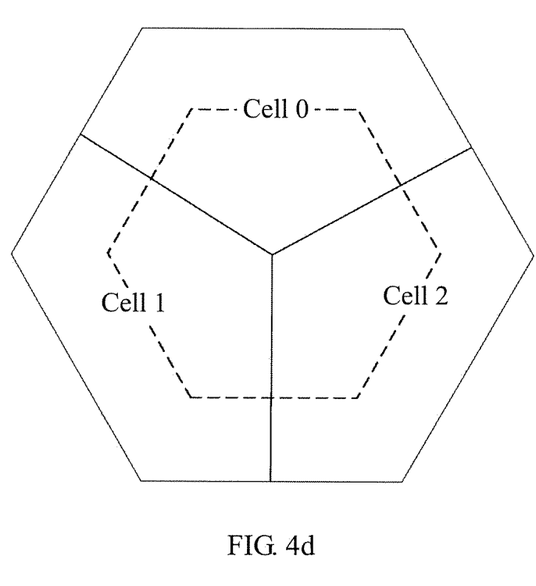
FIG. 4d is a schematic diagram of vertically splitting each traditional sector into 2 smaller sectors according to an embodiment of the present invention.
Figure 4E:
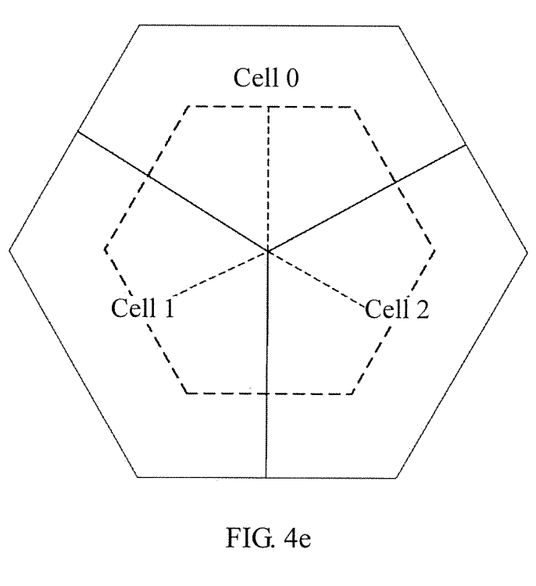
FIG. 4e is a schematic diagram of using a manner combining vertical splitting and horizontal splitting to split each traditional sector into 3 smaller sectors according to an embodiment of the present invention.
Figure 4F:
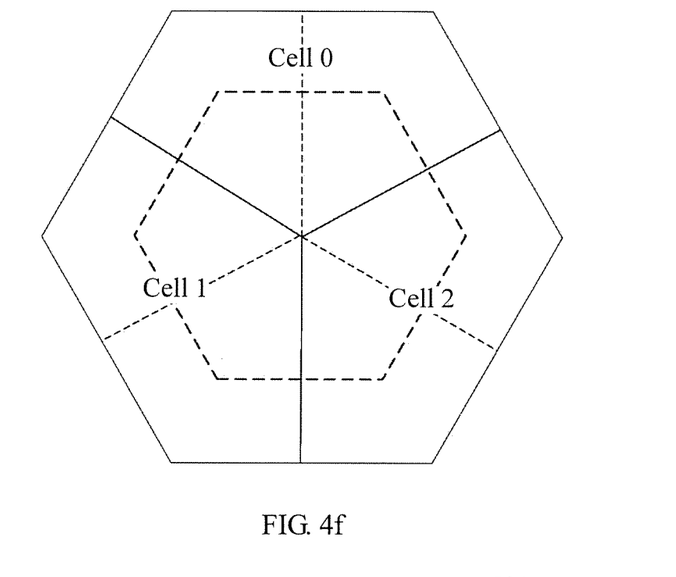
FIG. 4f is a schematic diagram of using a manner combining vertical splitting and horizontal splitting to split each traditional sector into 4 smaller sectors according to an embodiment of the present invention.

Multi-sector cell networking can be implemented by sector splitting. Manners for sector splitting include horizontal splitting, vertical splitting, and so on. In FIG. 4a to FIG. 4f, a dotted line indicates splitting a traditional sector into virtual sectors (that is, smaller sectors in the drawings). FIG. 4a is a schematic diagram of horizontally splitting each traditional sector into 2 smaller sectors and dividing a signal coverage area of a base station into 6 virtual sectors. FIG. 4b is a schematic diagram of horizontally splitting each traditional sector into 3 smaller sectors and dividing a signal coverage area of a base station into 9 virtual sectors. FIG. 4c is a schematic diagram of horizontally splitting each traditional sector into 4 smaller sectors and dividing a coverage area of a base station into 12 virtual sectors. FIG. 4d is a schematic diagram of vertically splitting each traditional sector into 2 smaller sectors and dividing a coverage area of a base station into 6 virtual sectors. FIG. 4e is a schematic diagram of using a manner combining vertical splitting and horizontal splitting to split each traditional sector into 3 smaller sectors and dividing a signal coverage area of a base station into 9 virtual sectors. FIG. 4f is a schematic diagram of using a manner combining vertical splitting and horizontal splitting to split each traditional sector into 4 smaller sectors and dividing a signal coverage area of a base station into 12 virtual sectors. In FIG. 4a to FIG. 4f, several smaller sectors into which a same traditional sector is split form a cell, and sectors in a same cell share a same cell identity. FIG. 4a to FIG. 4f list some possibilities of sector splitting, but the manners for sector splitting are not limited to the foregoing examples. In an actual application, a manner that is specifically used for sector splitting needs to be determined according to an actual situation.

The embodiments of the present invention are applicable to a Global System for Mobile Communications (GSM) system, a Universal Mobile Telecommunication System (UMTS), a Long Term Evolution (LTE) system, or a Worldwide Interoperability for Microwave Access (WiMAX) system. In an LTE system, an access network device is an evolved base station; in a WiMAX system, an access network device is a base station; in a UMTS system, an access network device includes a base station and a radio network controller (RNC), and a function of the access network device is jointly implemented by the base station and the RNC; and in a GSM system, an access network device includes a base station and a base station controller (BSC), and a function of the access network device is jointly implemented by the base station and the BSC.

The following describes in detail exemplary embodiments of the present invention with reference to the accompanying drawings.

Figure 5:
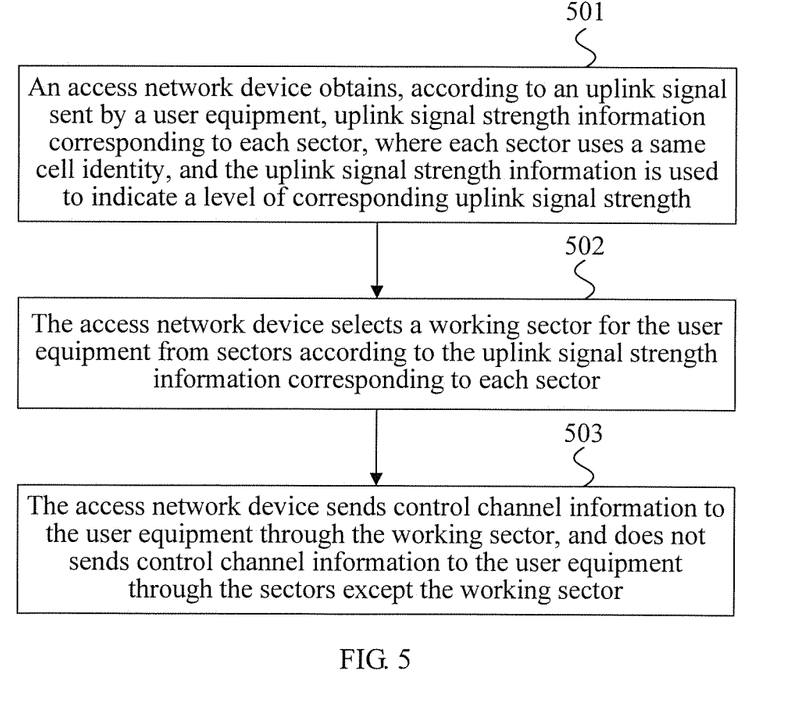
FIG. 5 is a flowchart of a method for sending control channel information based on multi-sector cell networking according to an embodiment of the present invention.

Referring to FIG. 5, an embodiment of the present invention provides a method for sending control channel information based on multi-sector cell networking. In a cell to which a user equipment (UE) belongs, the method includes the following steps:

Step 501: An access network device obtains, according to an uplink signal sent by a user equipment, uplink signal strength information corresponding to each sector, where each sector uses a same cell identity, and the uplink signal strength information is used to indicate a level of corresponding uplink signal strength.

In an actual application, sectors included in a cell to which a user equipment belongs share one cell identity, and an access network device obtains, through the sectors separately, an uplink signal sent by the user equipment, and further obtains uplink signal strength information corresponding to each sector, where the uplink signal strength information is used to indicate a level of corresponding uplink signal strength.

The uplink signal strength information may be a parameter such as a power value of an uplink signal, a signal strength value, or a signal to noise ratio. For example, the uplink signal strength information may be uplink reference signal received power (RSRP), an uplink received signal strength indicator (RSSI), an uplink signal-to-interference ratio (SINR), or the like.

Step 502: The access network device selects a working sector for the user equipment from sectors according to the uplink signal strength information corresponding to each sector.

Preferably, the access network device may compare the uplink signal strength information corresponding to each sector, and select a sector corresponding to a maximum value of uplink signal strength information as the working sector for the user equipment.

In an actual application, the access network device may start working sector detection after preset time arrives or may start working sector detection after the UE accesses a network, and compares the uplink signal strength information corresponding to the sectors. In order to facilitate implementation, the access network device may use a working sector detection timer and set a time period, to periodically start working sector detection; or may set several specific time points, to start working sector detection as scheduled.

Using a working sector detection timer, when the working sector detection timer times out, the access network device starts working sector detection and compares the uplink signal strength information corresponding to the sectors.

Through the foregoing steps, the access network device may determine a sector corresponding to uplink signal strength information with a greatest value as the working sector for the user equipment.

Step 503: The access network device sends control channel information to the user equipment through the working sector, and does not send the control channel information to the user equipment through the sectors except the working sector.

The access network device sends the control channel information to the user equipment through the determined working sector, and does not send the control channel information to the user equipment through a non-working sector in the cell where the user equipment is located.

The embodiments of the present invention provide a method and an apparatus for sending control channel information based on multi-sector cell networking, where a working sector is selected, according to an uplink signal sent by a user equipment, from sectors included in a cell to which the user equipment belongs, then control channel information is sent to the user equipment through the working sector, and the control channel information is not sent to the user equipment through the sectors except the working sector, to prevent a problem in a multi-sector cell networking technology that when a sector in a certain cell transmits a signal, a cell not adjacent to the sector is interfered with by the signal.

To facilitate description, a method for sending control channel information based on multi-sector cell networking is further described by using an LTE system as an example.

In an LTE multi-sector cell networking scenario, a UE accesses cell 0 to which an evolved base station (eNB) belongs, where cell 0 is split into several sectors, and the several sectors obtained by splitting cell 0 share a cell identity of cell 0.

In the cell to which the UE belongs, the eNB performs processing on an uplink signal received in each sector, including removing a cyclic prefix (CP), removing a direct current (DC), and discrete fourier transform (DFT), to obtain a processed uplink signal, in each sector, of the UE.

The eNB then obtains uplink signal strength information corresponding to the processed uplink signal of each sector, and uses a sector corresponding to a maximum value of uplink signal strength information as a working sector for the UE. For example, after obtaining RSRP of each processed uplink signal, the eNB uses a sector corresponding to a maximum value of RSRP as the working sector for the corresponding user equipment; or after obtaining an RSSI of each processed uplink signal, the eNB uses a sector corresponding to a maximum value of RSSI as the working sector for the corresponding user equipment; or after obtaining an SINR of each processed uplink signal, the eNB uses a sector corresponding to a maximum value of SINR as the working sector for the corresponding user equipment.

In an actual application, the uplink signal may include but is not limited to any one of the following:

a sounding reference signal (SRS), a demodulation reference signal (DMRS), and a physical uplink shared channel (PUSCH) signal; or a DMRS and a PUSCH signal; or an SRS and a physical uplink control channel (physical uplink control channel, PUCCH) signal; or a PUCCH signal; or a random access channel (RACH) signal.

Because the uplink signal may be a different signal or signal combination in different cases, a type of uplink signal strength information which is selected as a comparison standard varies according to a type of the uplink signal. The uplink signal strength information may be uplink RSRP, an uplink RSSI, an uplink SINR, or the like.

Preferably, when it is determined that the uplink signal includes an SRS, SRS RSRP may be used as a comparison standard, so as to select the working sector for the UE.

When the processed uplink signal includes an SRS and a DMRS, an SRS RSRP value is used as a comparison standard, so as to compare SRS RSRP corresponding to the sectors and select a sector corresponding to a maximum value of SRS RSRP as the working sector for the user equipment.

When the processed uplink signal does not include an SRS but includes a DMRS, an RSRP value is used as a comparison standard, so as to calculate the RSRP value of a corresponding sector according to the DMRS in the processed uplink signal, compare RSRP corresponding to the sectors, and select a sector corresponding to a maximum value of RSRP as the working sector for the user equipment.

When the processed uplink signal includes a PUCCH signal but does not include an SRS, a pilot frequency in the PUCCH signal is extracted, RSRP measurement and RSRP filtering are performed on the extracted pilot frequency to obtain an RSRP value, and the obtained RSRP value is used as a comparison standard, so as to compare RSRP corresponding to the sectors and select a sector corresponding to a maximum value of RSRP as the working sector for the user equipment.

Optionally, the eNB performs signal quality measurement and filtering on the processed uplink signal, and uses an obtained signal quality value as the uplink signal strength information corresponding to the processed uplink signal.

Optionally, the eNB performs SINR measurement and filtering on the processed uplink signal, and uses an obtained SINR as the uplink signal strength information corresponding to the processed uplink signal.

That is, in an actual application, when it is determined that the processed uplink signal includes a PUCCH signal but does not include an SRS, in order to reduce steps and time, a pilot frequency of the processed uplink signal may not be extracted, and an RSSI or an SINR of the PUCCH signal may be directly obtained, and the obtained RSSI or SINR is used as the uplink signal strength information, so as to select the working sector for the UE. RSSIs or SINRs corresponding to the sectors are compared, and a sector corresponding to an RSSI or SINR with a greatest value is selected as the working sector for the UE.

In an actual application, the eNB may update the working sector for the UE as scheduled or periodically, or may trigger an update of the working sector for the UE according to an event.

Specifically, if the eNB uses a working sector detection timer, when the working sector detection timer times out, the eNB starts working sector detection and compares the uplink signal strength information corresponding to the sectors.

The eNB sends control channel information to the UE through the determined working sector, and a non-working sector in the cell where the UE is located is not used to send the control channel information to the UE.

The eNB completes resource mapping for a control channel through the working sector, and performs processing on the control channel information, including fast fourier transformation (FFT) and adding a CP; and transmits the processed control channel information to the UE through an antenna corresponding to the working sector.

The control channel information may include but is not limited to: grant information (such as uplink grant information and downlink grant information), feedback information of uplink data (ACK/NACK information), or the like.

In an actual application, before sending the control channel information to the user equipment through the working sector for the UE, the eNB further needs to calculate, according to a signal to noise ratio of the UE, the number and location of resource elements (RE) occupied by a downlink control channel of the UE, and perform control channel resource allocation for the UE. After that, the eNB can send the control channel information to the user equipment through the working sector for the UE on a preset frequency domain location, thereby implementing reasonable allocation of frequency domain resources and reducing consumption of system resources.

A method for sending control channel information based on multi-sector cell networking is described in detail by using virtual 6-sector in LTE as an example.

Figure 6:
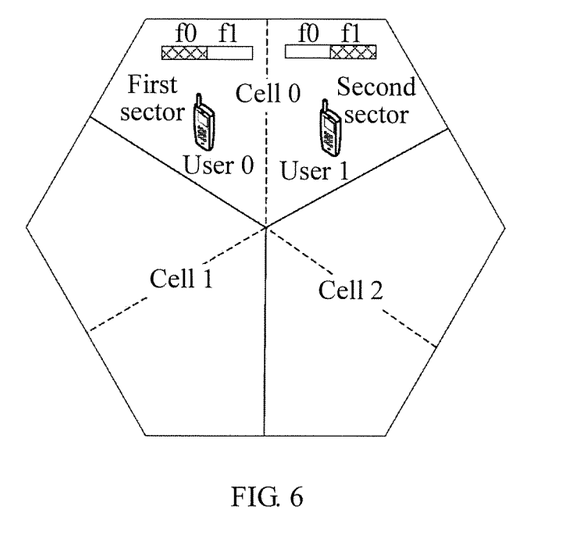
FIG. 6 is a schematic diagram of sending control channel information to user equipments separately located in different sectors in a cell according to an embodiment of the present invention.

Referring to FIG. 6, user 0 and user 1 are 2 UEs, cell 0, cell 1, and cell 2 are 3 cells of an eNB, where user 0 is located in a first sector of cell 0, user 1 is located in a second sector of cell 0, the first sector and the second sector share a cell identity of cell 0, and f0 and f1 are frequency domain locations, in which the eNB transmits control channel information to different UEs in cell 0 on the frequency domain locations. In GSM, UMTS, and TD-SCDMA systems, f0 and f1 may be different frequencies, and in an LTE or WiMAX system, f0 and f1 are time-frequency resource blocks.

The eNB receives, through the first sector and the second sector in cell 0 separately, an uplink signal sent by user 0, and selects a working sector for user 0 according to RSRP of the two received uplink signals. For example, for user 0, if the eNB determines that an RSRP value corresponding to the first sector is greater than an RSRP value corresponding to the second sector, the eNB selects the first sector as the working sector for user 0. The eNB sends control channel information to user 0 through the first sector in frequency location f0, and the second sector is not used to send the control channel information to user 0 in frequency location f0.

Similarly, the eNB receives, through the first sector and the second sector in cell 0 separately, an uplink signal sent by user 1, and selects a working sector for user 1 according to RSRP of the two received uplink signals. For example, for user 1, if the eNB determines that an RSRP value corresponding to the second sector is greater than an RSRP value corresponding to the first sector, the eNB selects the second sector as the working sector for user 1. The eNB instructs the second sector to send control channel information to user 1 on frequency location f1, and the first sector is not used to send the control channel information to user 1 in frequency location f1.

In the foregoing embodiment, through each sector included in a cell to which a user equipment belongs, an uplink signal sent by the user equipment is received, uplink signal strength information corresponding to each sector is obtained, a working sector for the user equipment is determined, control channel information is sent to the user equipment through the working sector, and the other sectors are not used to send the control channel information. In this way, control channel information is selectively sent in several sectors in a same cell, thereby solving a problem in a multi-sector cell networking technology that when a sector in a certain cell transmits a signal, a cell not adjacent to the sector is interfered with by the signal, further improving performance of a control channel, saving system resources, and effectively improving performance of a wireless network.

In an actual application, an overlapping area of coverage areas of different sectors generally exists. Optionally, an access network device may first determine whether a UE is in a non-overlapping area of different sectors of a cell where the UE is located, and then determine a working sector for the UE. If the UE is in a non-overlapping area of different sectors, that is, there is only one working sector for the UE, the eNB sends the control channel information to the UE through the only working sector for the UE; otherwise, the eNB still uses a manner of joint transmission to send the control channel information to the UE.

Whether a UE is in an overlapping area of different sectors in a same cell may be determined by comparing uplink signal strength information corresponding to sectors in the cell to which the UE belongs. After a greatest value of these pieces of uplink signal strength information is determined, if it is determined that values of several pieces of uplink signal strength information are close to the determined greatest value, it can be determined that the UE is in an overlapping area of sectors corresponding to these pieces of uplink signal strength information.

That is, the access network device first selects a first sector corresponding to a maximum value of uplink signal strength information as a first working sector for the user equipment; and if a difference between the uplink signal strength information of the first working sector and uplink signal strength information of any other sector is greater than a preset threshold, the access network device determines that the first working sector is the working sector for the user equipment.

In this case, the UE is not in an overlapping area of different sectors. The access network device sends control channel information to the UE through the first working sector, and does not send control channel information to the UE through all the other sectors in the cell to which the UE belongs. The preset threshold corresponds to the uplink signal strength information. Specifically, the preset threshold may vary according to types of uplink signal strength information.

If a difference between the uplink signal strength information of the first working sector and uplink signal strength information of a second sector is less than the preset threshold, the access network device determines that the UE is in an overlapping area of the sectors, and uses the second sector as a second working sector for the UE. The access network device may use a manner of joint transmission to send control channel information to the UE through the first working sector and the second working sector, while the other sectors in the cell to which the UE belongs are not used to send the control channel information to the UE. If a third sector exists, where a difference between the uplink signal strength info Elation of the first working sector and uplink signal strength information of the third sector is less than the preset threshold, the access network device determines that the UE is in an overlapping area of the sectors, and uses the third sector as a third working sector for the UE. The access network device may use a manner of joint transmission to send control channel information to the UE through the first working sector, the second working sector, and the third working sector.

Figure 7:
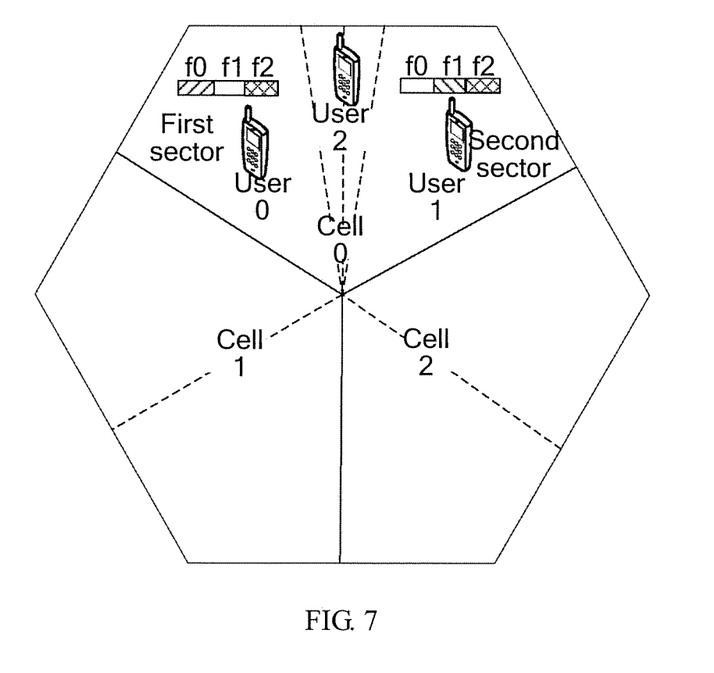
FIG. 7 is a schematic diagram of sending control channel information to three user equipments located in different sectors of a cell and an overlapping coverage area of two sectors according to an embodiment of the present invention.

The foregoing method for sending control channel information is described in detail by using virtual 6-sector in LTE as an example. Referring to FIG. 7, cell 0, cell 1, and cell 2 are 3 cells of a same base station, and user 0, user 1, and user 2 are 3 UEs, where user 0 is located in a first sector of cell 0, user 1 is located in a second sector of cell 0, user 2 is located in an overlapping coverage area of the two sectors of cell 0, and f0, f1, and f2 are frequency domain locations, where an eNB transmits control channel information to different UEs.

The eNB receives, through the first sector and the second sector in cell 0 separately, an uplink signal sent by user 0, and selects a working sector for user 0 according to RSRP of the two uplink signals. The eNB first selects a sector corresponding to a maximum value of RSRP as a first working sector for user 0, for example, first selects the first sector as the first working sector for user 0. The eNB determines whether a difference between an RSRP value corresponding to the first working sector and an RSRP value corresponding to the second sector is greater than a preset threshold, where the preset threshold is a threshold corresponding to RSRP. For example, the first working sector is used as the working sector for user 0 if the difference between the RSRP value corresponding to the first working sector and the RSRP value corresponding to the second sector is greater than the preset threshold, that is, user 0 is in a non-overlapping area of the first sector and the second sector. The eNB sends control channel information to user 0 through the working sector, that is, the first sector, on f0, and the second sector is not used to send the control channel information to user 0.

For user 1, the eNB receives, through the first sector and the second sector in cell 0 separately, an uplink signal sent by user 1, and selects a working sector for user 1 according to RSRP of the two received uplink signals. The eNB first selects a sector corresponding to a maximum value of RSRP as a first working sector for user 1, for example, first selects the second sector as the first working sector for user 1. The eNB determines whether a difference between an RSRP value corresponding to the first working sector and an RSRP value corresponding to the first sector is greater than a preset threshold, where the preset threshold is a threshold corresponding to RSRP. For example, the eNB uses the first working sector as the working sector for user 1 if the difference between the RSRP value corresponding to the first working sector and the RSRP value corresponding to the first sector is greater than the preset threshold, that is, user 1 is in a non-overlapping area of the first sector and the second sector. The eNB sends control channel information to user 1 through the working sector (that is, the second sector) on f1, and the first sector is not used to send the control channel information to user 1.

For user 2, the eNB receives, through the first sector and the second sector in cell 0 separately, an uplink signal sent by user 2, and selects a working sector for user 2 according to RSRP of the two received uplink signals. The eNB first selects a sector corresponding to a maximum value of RSRP as a first working sector for user 2, for example, first selects the first sector as the first working sector for user 2. The eNB determines whether a difference between an RSRP value corresponding to the first working sector and an RSRP value corresponding to the second sector is greater than a preset threshold, where the preset threshold is a threshold corresponding to RSRP. For example, the eNB uses the second sector as a second working sector for user 2, that is, the eNB uses both the first sector and the second sector as working sectors for user 2 if the difference between the RSRP value corresponding to the first working sector and the RSRP value corresponding to the second sector is less than the preset threshold, that is, user 2 is in an overlapping area of the first sector and the second sector. The eNB uses a manner of joint transmission to send control channel information to user 2 through the two working sectors, that is, when the control channel information is sent to user 2 through the first sector in f2, and the control channel information is also sent to user 2 through the second sector on f2.

In the foregoing embodiment, when a unique working sector for a user equipment is determined, the sector is used to send control channel information to the user equipment, and all the other sectors in a cell to which the user equipment belongs are not used to send the control channel information to the user equipment; and when it is determined that the user equipment is in an overlapping area of adjacent sectors in the same cell, the adjacent sectors are used to jointly send the control channel information. In this way, when the user equipment is not in an overlapping area of adjacent sectors in a same cell, a problem that when a sector in a certain cell transmits a signal a cell not adjacent to the sector is interfered with by the signal is prevented, and system resources are saved; when the user equipment is in an overlapping area of adjacent sectors in a same cell, a manner of jointly sending control channel information is used, which improves signal quality of sent control channel information and therefore satisfies diverse requirements on diversity in an actual application.

Figure 8:
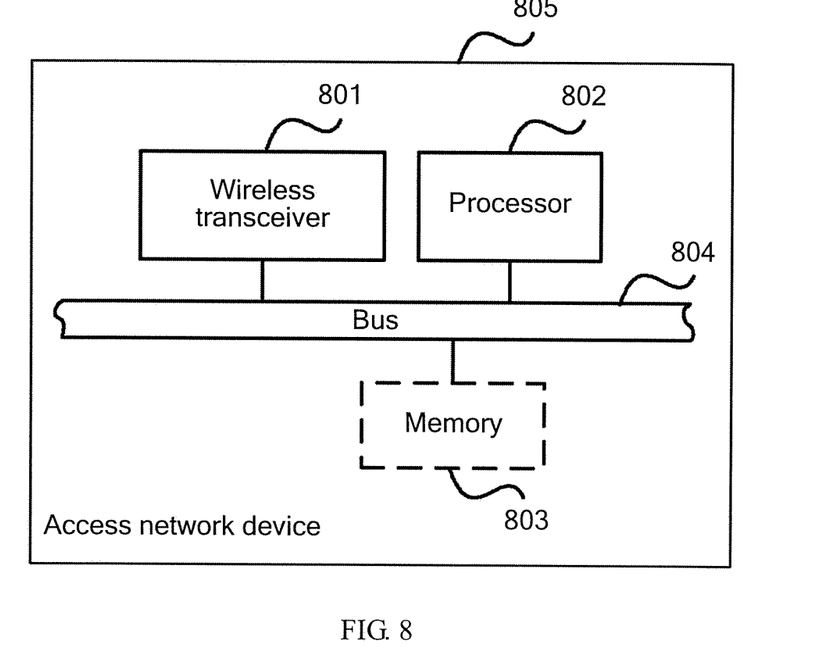
FIG. 8 is a schematic diagram of an access network device based on multi-sector cell networking according to an embodiment of the present invention.

An embodiment of the present invention provides an access network device 805. Referring to FIG. 8, the access network device 805 includes: at least one wireless transceiver 801, at least one processor 802, at least one memory 803, and a bus 804. The at least one wireless transceiver 801, the at least one processor 802, and the at least one memory 803 are connected and communicate by using the bus 804.

The bus 804 may be an Industry Standard Architecture (ISA) bus, a Peripheral Component Interconnect (PCI) bus, an Extended Industry Standard Architecture (EISA) bus, or the like. The bus 804 may be classified into an address bus, a data bus, a control bus, and the like. In order to facilitate presentation, the bus is represented only by a line in FIG. 8, but it does mean that only one bus or one type of bus exists.

The memory 803 is configured to store program code, where the program code includes an operating instruction. The memory 803 may include a high-speed random access memory (RAM), or may include a non-volatile memory, for example, a magnetic disk memory.

The processor 802 may be a central processing unit (CPU), an application specific integrated circuit (ASIC), or one or more integrated circuits configured to implement the embodiment of the present invention.

The wireless transceiver 801 is mainly configured to receive and transmit communication data between the access network device 805 in this embodiment and a user equipment UE.

Specifically, the wireless transceiver 801 is configured to receive, through each sector separately, an uplink signal sent by the user equipment.

The processor 802 is configured to invoke the program code in the memory 803, to execute the following operations:

obtaining, according to the uplink signal received by the wireless transceiver 801, uplink signal strength information corresponding to each sector, where each sector uses a same cell identity, and the uplink signal strength information is used to indicate a level of corresponding uplink signal strength;

selecting a working sector for the user equipment from sectors according to the uplink signal strength information corresponding to each sector; and instructing the wireless transceiver 801 to send control channel information to the user equipment through the working sector, and instructing the wireless transceiver 801 not to send the control channel information to the user equipment through the sectors except the working sector.

The wireless transceiver 801 is further configured to send the control channel information to the user equipment.

Preferably, the processor 802 is specifically configured to compare the uplink signal strength information corresponding to the sectors, and select a sector corresponding to a maximum value of uplink signal strength information as the working sector for the user equipment.

Further, the processor 802 is configured to: when a working sector detection timer times out, start working sector detection, and compare the uplink signal strength information corresponding to the sectors.

Optionally, the processor 802 is specifically configured to select a first sector corresponding to a maximum of uplink signal strength information as a first working sector for the user equipment; and if a difference between the uplink signal strength information of the first working sector and uplink signal strength information of any other sector is greater than a preset threshold, determine that the first working sector is the working sector for the user equipment.

The uplink signal strength information corresponding to each sector and obtained by the processor 802 according to the uplink signal sent by the wireless transceiver 801 may include but is not limited to any one of uplink RSRP, an uplink RSSI, and an uplink SINR.

In an actual application, the wireless transceiver 801 may be a signal receiving antenna.

In an LTE system, the access network device 805 is an eNB; in a WiMAX system, the access network device is a base station; in a UMTS system, the access network device includes a base station and a radio network controller; and in a GSM system, the access network device includes a base station and a base station controller.

Figure 9:
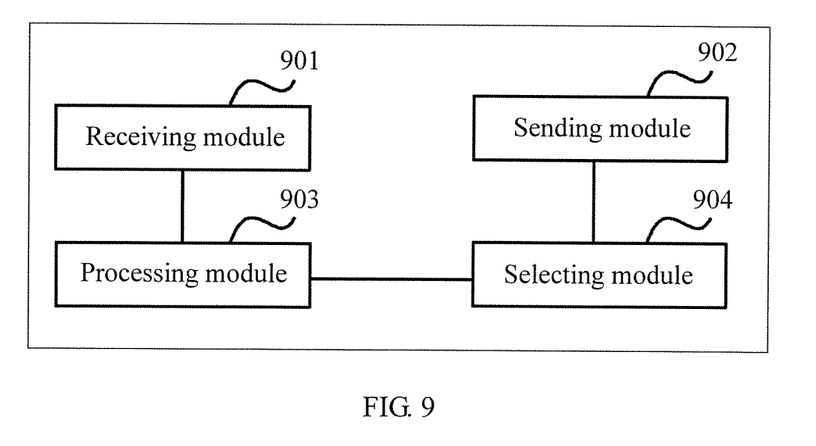
FIG. 9 is a schematic diagram of an apparatus for sending control channel information based on multi-sector cell networking according to an embodiment of the present invention.

Based on the same design idea, an embodiment of the present invention further provides an apparatus for sending control channel information based on multi-sector cell networking. Referring to FIG. 9, the apparatus includes:

a receiving module 901, configured to receive an uplink signal sent by a user equipment;

a sending module 902, configured to send control channel information to the user equipment;

a processing module 903, configured to obtain, according to the uplink signal sent by the user equipment and received by the receiving module 901, uplink signal strength information corresponding to each sector, where each sector uses a same cell identity, and the uplink signal strength information is used to indicate a level of corresponding uplink signal strength; and a selecting module 904, configured to select a working sector for the user equipment from sectors according to the uplink signal strength information corresponding to each sector and obtained by the processing module 903, where the processing module 903 is further configured to instruct the sending module 902 to send the control channel information to the user equipment through the working sector selected by the selecting module 904, and instruct the sending module 902 not to send the control channel information to the user equipment through the sectors except the working sector.

Preferably, the selecting module 904 is specifically configured to compare the uplink signal strength information corresponding to the sectors and obtained by the processing module 903, and select a sector corresponding to a maximum value of uplink signal strength information as the working sector for the user equipment.

Further, the selecting module 904 is configured to: when a working sector detection timer times out, start working sector detection, and compare the uplink signal strength information corresponding to the sectors.

Optionally, the selecting module 904 is specifically configured to select a first sector corresponding to a maximum value of uplink signal strength information as a first working sector for the user equipment; and if a difference between the uplink signal strength information of the first working sector and uplink signal strength information of any other sector is greater than a preset threshold, determine that the first working sector is the working sector for the user equipment.

The uplink signal strength information corresponding to each sector and obtained by the processing module 903 may include but is not limited to any one of RSRP, an RSSI, and an SINR.

In an LTE system, the apparatus is an eNB; in a WiMAX system, the apparatus is a base station; in a UMTS system, the apparatus includes a base station and a radio network controller; and in a GSM system, the apparatus includes a base station and a base station controller.

Figure 10:
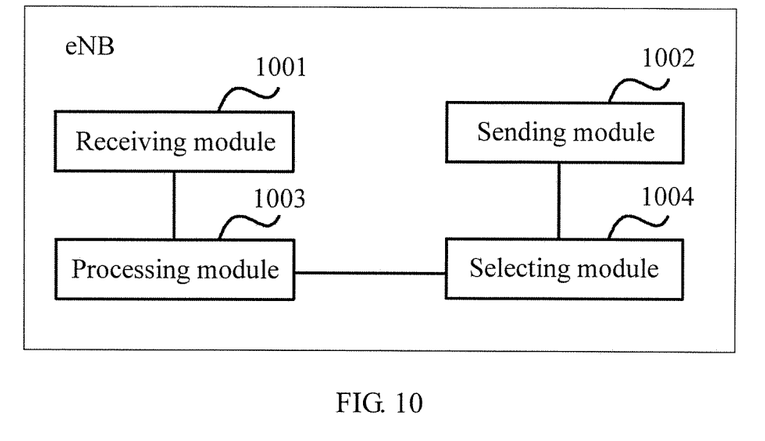
FIG. 10 is a schematic structural diagram of an eNB in LTE according to an embodiment of the present invention.

The following describes, by using virtual 6-sector in a LTE system as an example and with reference to FIG. 10, in detail an application of the apparatus for sending control channel information based on multi-sector cell networking (in the LTE system, the apparatus is an eNB). It is assumed that cell 0 and cell 1 are 2 cells of a same base station, user 0 and user 1 are 2 UEs, user 0 is located in a first sector of cell 0, user 1 is located in a second sector of cell 0, and f0 and f1 are frequency domain locations, where the eNB transmits control channel information to different UEs.

Referring to FIG. 10, the eNB includes a receiving module 1001, a sending module 1002, a processing module 1003, and a selecting module 1004. A process for the eNB to send control channel information is as follows:

The receiving module 1001 receives, through the first sector and the second sector in cell 0 separately, an uplink signal sent by user 0, the processing module 1003 obtains RSRP of the two uplink signals received by the receiving module 1001, and the selecting module 1004 selects a working sector for user 0. The selecting module 1004 first selects a sector corresponding to a maximum value of RSRP as a first working sector for user 0, for example, first selects the first sector as the first working sector for user 0, and determines whether a difference between an RSRP value corresponding to the first working sector and an RSRP value corresponding to the second sector is greater than a preset threshold, where the preset threshold is a threshold corresponding to RSRP. For example, the selecting module 1004 selects the first working sector as the working sector for user 0 if the difference between the RSRP value corresponding to the first working sector and the RSRP value corresponding to the second sector is greater than the preset threshold, that is, user 0 is in a non-overlapping area of the first sector and the second sector. The processing module 1003 instructs the sending module 1002 to send control channel information to user 0 through the working sector selected by the selecting module 1004, that is, the processing module 1003 instructs the sending module 1002 to transmit, on f0 through the first sector selected by the selecting module 1004, the control channel information to user 0, and the processing module 1003 also instructs the sending module 1002 not to send, through the second sector, the control channel information to user 0.

For user 1, the receiving module 1001 receives, through the first sector and the second sector in cell 0 separately, an uplink signal sent by user 1, the processing module 1003 obtains RSRP of the two uplink signals received by the receiving module 1001, and the selecting module 1004 selects a working sector for user 1. The selecting module 1004 first selects a sector corresponding to a maximum value of RSRP as a first working sector for user 1, for example, first selects the second sector as the first working sector for user 1, and determines whether a difference between an RSRP value corresponding to the first working sector and an RSRP value corresponding to the first sector is greater than a preset threshold, where the preset threshold is a threshold corresponding to RSRP. For example, the selecting module 1004 uses the first working sector as the working sector for user 1 if the difference between the RSRP value corresponding to the first working sector and the RSRP value corresponding to the first sector is greater than the preset threshold, that is, user 1 is in a non-overlapping area of the first sector and the second sector. The processing module 1003 sends, by using the sending module 1002, control channel information to user 1 through the working sector selected by the selecting module 1004, that is, the processing module 1003 instructs the sending module 1002 to send, on f1 through the second sector selected by the selecting module 1004, the control channel information to user 1, and the processing module 1003 also instructs the sending module 1002 not to send, through the first sector, the control channel information to user 1.

According to the embodiment of the present invention, in a cell to which a user equipment belongs, uplink signal strength information corresponding to each sector is obtained according to an uplink signal sent by the user equipment, a working sector for the user equipment is determined according to the uplink signal strength information corresponding to each sector, then control channel information is sent to the user equipment through the working sector, and the control channel information is not sent to the user equipment through the sectors except the working sector. In this way, a cell is not affected by a sector which is not adjacent to the cell, and signal interference is therefore prevented; a signal-to-interference ratio of a control channel is improved; and network indicators such as a handover success rate and an access success rate are improved. In addition, a capacity of a control channel is expanded, which further improves performance of the control channel, reduces consumption of system resources, and effectively improves performance of a wireless network.

A person skilled in the art should understand that the embodiments of the present invention may be provided as a method, a system, or a computer program product. Therefore, the present invention may take a form of a complete hardware embodiment, a complete software embodiment, or an embodiment combining software and hardware. In addition, the present invention may take a form of a computer program product implemented on one or more computer usable storage mediums (include but are not limited to a disk memory, a CD-ROM, an optical memory, and the like) which include computer usable program code.

The present invention is described with reference to a flowchart and/or a block diagram of the method, device (system), and computer program product according to the embodiments of the present invention. It should be understood that each process and/or each block in the flowchart and/or the block diagram and a combination of processes and/or blocks in the flowchart and/or the block diagram may be implemented by computer program instructions. These computer program instructions may be provided for a processor of a general-purpose computer, a special-purpose computer, an embedded processor, or another programmable data processing device to generate a machine, so that an apparatus for implementing a function specified in one or more processes in the flowchart and/or one or more blocks in the block diagram is generated through the instructions executed by the processor of the computer or the other programmable data processing devices.

These computer program instructions may also be stored in a computer readable memory capable of guiding a computer or another programmable data processing device to work in a particular manner, so that the instructions stored in the computer readable memory generate a manufactured product including an instruction apparatus, where the instruction apparatus implements a function specified in one or more processes in the flowchart and/or one or more blocks in the block diagram.

These computer program instructions may also be loaded onto a computer or another programmable data processing device, so that a series of operating steps are executed on the computer or the another programmable data processing device, so as to produce processing implemented by the computer, so that the instructions executed on the computer or the another programmable data processing device provide a step for implementing a function specified in one or more processes in the flowchart and/or one or more blocks in the block diagram.

Although the exemplary embodiments of the present invention are already described, a person skilled in the art may make an alteration or a modification to these embodiments once learning a basic creative concept. Therefore, the appended claims are intended to be explained as including the exemplary embodiments and all alterations and modifications which fall within the scope of the present invention.

Obviously, a person of skilled in the art can make modifications and variations to the embodiments of the present invention without deviating from the spirit and scope of the present invention. Therefore, if the modifications and variations made to the embodiments of the present invention fall within the scope of the claims and technologies equivalent to the claims of the present invention, the present invention is intended to include these modifications and variations.

What is claimed is:

1. An access network device based on multi-sector cell networking, the access network device comprising:
at least one wireless transceiver, at least one processor, and at least one memory, wherein the memory is configured to store program code;
wherein the wireless transceiver is configured to receive, through each sector separately, an uplink signal sent by a user equipment (UE);
wherein the processor is configured to:
obtain, according to the uplink signal received by the wireless transceiver, uplink signal strength information corresponding to each sector, wherein each sector uses a same cell identity, and the uplink signal strength information is used to indicate a level of corresponding uplink signal strength,
select a working sector for the UE from sectors according to the uplink signal strength information corresponding to each sector, and
instruct the wireless transceiver to send control channel information to the UE through the working sector, and instruct the wireless transceiver not to send the control channel information to the UE through the sectors except the working sector; and
wherein the wireless transceiver is further configured to send the control channel information to the UE.

2. The access network device according to claim 1, wherein the processor is configured to:
compare the uplink signal strength information corresponding to the sectors, and select a sector corresponding to a maximum value of uplink signal strength information as the working sector for the user equipment.

3. The access network device according to claim 2, wherein the processor is further configured to:
when a working sector detection timer times out, start working sector detection, and compare the uplink signal strength information corresponding to the sectors.

4. The access network device according to claim 1, wherein the processor is configured to:
select a first sector corresponding to a maximum value of uplink signal strength information as a first working sector for the UE; and
if a difference between the uplink signal strength information of the first working sector and uplink signal strength information of any other sector is greater than a preset threshold, determine that the first working sector is the working sector for the UE.

5. The access network device according to claim 1, wherein the uplink signal strength information comprises any one of the following:
uplink reference signal received power (RSRP);
an uplink received signal strength indicator (RSSI); and
an uplink signal-to-interference ratio (SINR).

6. The access network device according to claim 1, further comprising:
an evolved NodeB (eNB) in an long term evolution (LTE) system.

7. The access network device according to claim 1, wherein the control channel information comprises:
grant information; or
feedback information of uplink data.

8. A method for sending control channel information based on multi-sector cell networking, the method comprising:
obtaining, by an access network device, according to an uplink signal sent by a user equipment CUE), uplink signal strength information corresponding to each sector, wherein each sector uses a same cell identity, and the uplink signal strength information is used to indicate a level of corresponding uplink signal strength;
selecting, by the access network device, a working sector for the UE from the sectors according to the uplink signal strength information corresponding to each sector; and
sending, by the access network device, the control channel information to the UE through the working sector, and skipping sending the control channel information to the UE through the sectors except the working sector.

9. The method according to claim 8, wherein selecting, by the access network device, a working sector for the UE according to the uplink signal strength information corresponding to each sector comprises:
comparing, by the access network device, the uplink signal strength information corresponding to the sectors; and selecting, by the access network device, a sector corresponding to a maximum value of uplink signal strength information as the working sector for the user equipment.

10. The method according to claim 9, wherein comparing, by the access network device, the uplink signal strength information corresponding to the sectors comprises:
when a working sector detection timer times out, starting, by the access network device, working sector detection; and
comparing, by the access network device, the uplink signal strength information corresponding to the sectors.

11. The method according to claim 8, wherein selecting, by the access network device, a working sector for the UE according to the uplink signal strength information corresponding to each sector comprises:
selecting, by the access network device, a first sector corresponding to a maximum value of uplink signal strength info/nation as a first working sector for the UE; and if a difference between the uplink signal strength information of the first working sector and uplink signal strength information of any other sector is greater than a preset threshold, determining, by the access network device, that the first working sector is the working sector for the UE.

12. The method according to claim 8, wherein the uplink signal strength information comprises any one of the following:
uplink reference signal received power (RSRP);
an uplink received signal strength indicator (RSSI); and
an uplink signal-to-interference ratio (SINR).

13. The method according to claim 8, wherein the access network device comprises:
an evolved NodeB (eNB) in an long term evolution (LTE) system.

14. The method according to claim 8, wherein the control channel information comprises:
grant information; or
feedback information of uplink data.

* * * * *